Patented Feb. 14, 1939

2,147,594

UNITED STATES PATENT OFFICE 2,147,594

RECOVERY OF CELLULOSE ESTERS

Robert B. Dayton, Rochester, N. Y., assignor to Eastman Kodak Company, Rochester, N. Y., a corporation of New Jersey No Drawing. Application September 14, 1937, Serial No. 163,797

10 Claims. (Cl. 260—230)

This application relates to the recovery of an organic acid ester of cellulose, which has been used as the base for photographic film from scrap film, by means of isopropyl alcohol.

Photographic film is composed of photosensitive gelatin emulsion supported by a reenforcing layer commonly referred to as the film base. Often the film base needs to be overcoated or subbed with a layer of material to promote the adhesion of the photo-sensitive emulsion thereto. When photographic film is scrapped, it is desirable to recover the organic acid ester of cellulose which is used as the base of the film. To do this requires the removal of the photosensitive emulsion and of the subbing layer. The emulsion is easily removed with warm water however the removal of the subbing layer presents some difficulty.

Various methods have been proposed for removing these subbing materials from film scrap. For instance, leaching of the scrap with various types of solvents has been suggested. Many of the solvents proposed are quite volatile and, unless care is observed, there may be much loss of solvent by evaporation. Also, because of their low boiling point, it is sometimes expensive to recover the solvents from the material with which they have become contaminated, particularly water from the leaching operation.

I have found that isopropyl alcohol is eminently suited to the removal of the layers, composed of polyester resins, which are used as a sublayer on film base comprising organic acid esters of cellulose. In the subbing of film, polyester resins, such as polyvinyl esters or polyacrylic acid esters, may be used. I have found that resins of this nature may be removed from the film scrap, after the emulsion has been removed therefrom without affecting the quality or physical make-up of the cellulose ester which comprises the film base. I prefer to employ isopropyl alcohol which contains but a small proportion of water, initially, as the alcohol becomes ineffective when it contains more than 30–40% of water. As the film scrap is usually in a wet condition from the removal of the emulsion, the isopropyl alcohol becomes diluted thereby to some extent. I have found, however, that the commercial isopropyl alcohol which is a constant boiling mixture containing about 12½% by weight of water is very satisfactory for use in accordance with my invention.

As an example of recovering the ester from scrap film, the scrap is comminuted and then washed with warm water to remove the emulsion and any other gelatin coatings that may be present thereon. It is then leached with a bath initially consisting of isopropyl alcohol, preferably in a counter-current system. It is preferred that the scrap be treated with more than one change of alcohol, as this has been found to be more effective in the removal of the resin layer than merely one leaching step, even though a large excess of the alcohol is used. After the subbing layers have been sufficiently removed, the scrap is then preferably washed with water to thoroughly remove the alcohol and recover it from the scrap. If, however, the presence of the isopropyl alcohol is not objectionable, the scrap can be dissolved in a suitable solvent and used directly. After the scrap has been thoroughly washed, it is then dried and stored for use in the preparation of solutions for making colloidized products therefrom. My invention is particularly suited for the leaching of scrap having the base of an ester which has been hydrolyzed considerably. As the isopropyl alcohol does not exert an appreciable softening action thereon, a clear-cut separation may be obtained.

The use of isopropyl alcohol avoids the great loss of solvent by evaporation which may characterize other leaching processes, and also allows of easy recovery because of its high boiling point, thereby contributing to the economy of the process. It is preferred, in treating the resins with the isopropyl alcohol, to use sufficient of the leaching liquid to float the comminuted film. The resulting fluidity of the mass will allow an easy and effective agitation. In the leaching with isopropyl alcohol, it is usually possible to use the alcohol nine times before it becomes so aqueous that it loses its effectiveness. When the isopropyl alcohol has been used nine times with the ordinary wet scrap, it usually surpasses the range of 30–40% water content and a concentrated supply must be substituted therefor. As the leaching is carried out, preferably counter-currently, the film scrap is subjected to various concentrations of the alcohol and at least one stage (usually the last) involves subjecting the scrap to the alcohol in concentrated form.

Obviously, the scrap might be dried after removing the gelatin before the leaching with the isopropyl alcohol. In that case a substitution of new isopropyl alcohol for that being used is necessary only infrequently. It is preferable, however in actual practice to treat the film under wet conditions and depend upon the isopropyl alcohol to take the water therefrom rather than drying the comminuated film prior to the treatment. The following examples illustrate processes embodying my invention:

*Example I*

Approximately 500 lbs. of wet film, from which the gelatin emulsion has been removed and from which the excess of water has been drained but which still contains a subbing layer of a polyvinyl acetate resin, was placed in a vessel containing 800 gals. of isopropyl alcohol at room temperature. The comminuted film was stirred therein for approximately one hour after which the liquid was removed and a fresh batch of isopropyl alcohol was added and the operation was repeated. Three changes of one hour each were used. In practice it is preferred that the more dilute isopropyl alcohol be used on the wettest film, as by this means the more concentrated isopropyl alcohol acts upon the film containing the least moisture and thereby the resin is effectively removed and the most dilute alcohol, after a sufficient number of times, can be taken from the system and the new alcohol can be added in the third leaching step. The leaching is followed by two one-half hour washes with water to remove the isopropyl alcohol from the film. It is then dried and stored for reuse for making colloidized products. The isopropyl alcohol can be separated from the water by distillation and the newly concentrated alcohol can then be reused for further leaching.

*Example II*

The emulsion was removed from a comminuted film scrap which had been subbed with polymerized ethyl acrylate, by washing in warm water. The water was then drained off and the scrap was leached with isopropyl alcohol, as described in the previous example. The resin was substantially completely removed from the comminuted scrap. The scrap was then dried and stored for use in making colloidized products therefrom.

In the carrying out of leaching, in accordance with my invention, it is usually most advantageous to carry out the same at room temperature or, at least, within limits not above 110° C. Although higher temperatures might be used, the loss of alcohol and the hazard attendant upon operating the leaching is increased. If desired, however, a closed system or one in which a refluxing action occurs may be used.

Although the use of isopropyl alcohol alone is quite suitable in practice, particularly due to the ease of recovery from its aqueous solution, when it alone is present, other alcohols, such as ethyl, may be mixed therewith in small amounts if desired.

As pointed out above, my invention is adapted to remove subbing material or polyester resins, particularly resins such as polyvinyl acetate, polyvinyl propionate, and polymerized acrylic acid esters of the lower alcohol, such as the polymer of methyl acrylate, ethyl acrylate or the like, alkyl or glyptal resins formed from the reaction between a polyhydric alcohol and a polybasic acid such as a resin formed by the reaction of glycerine and phthalic anhydride, having a melting point of 100° C. and an acid number of 100, resins formed by the reaction of formaldehyde with paratoluene sulfonamid, commonly known as santolite resins and polyvinyl acetal resins such as polyvinyl formal or formacetal, particularly those which have been partially hydrolyzed.

In the leaching operation it is preferred that a substantial amount of the liquid be employed so that each particle of scrap is uniformly treated with the alcohol, thereby assuring a substantially complete removal of the resin therefrom. My process is particularly applicable to the treatment of a comminuted film scrap, such as has been obtained by chopping, due to the ease of handling it. Nevertheless, scrap, which has not been broken up into extremely small pieces may be treated as there may be some other convenient physical form which can be used. For instance, the film in long strips, might be run through a bath of isopropyl alcohol, after the emulsion has been removed therefrom. Also, the leaching might be conducted by a continuous process by running the film through a chamber in which it is being sprayed with the leaching bath. If tinting material is present in the scrap, it may be removed by the isopropyl alcohol or it may be necessary that the scrap be given an additional treatment to remove the color, such as a bleaching or the action of a solvent which will not dissolve the film base. If a colored film is desired, the tinting material might be left in the scrap which will result in a faintly tinted colloidized product.

I claim:

1. A method for recovering photographic film scrap having a base of a lower fatty acid ester of cellulose and a subbing layer of polyvinyl acetate which comprises washing the film scrap with warm water to remove the emulsion therefrom and then leaching it with isopropyl alcohol.

2. A method for recovering photographic film scrap having a base of a lower fatty acid ester of cellulose and a subbing layer of a polymerized alkyl acrylate which comprises washing the film scrap with warm water to remove the emulsion therefrom and then leaching it in a liquid initially consisting of isopropyl alcohol.

3. A method for recovering cellulose acetate which is in intimate contact with a synthetic resin which comprises leaching the mass with isopropyl alcohol until the resin is substantially removed.

4. A method for recovering photographic film scrap having a base of a lower fatty acid ester of cellulose and a subbing layer of a polyvinyl acetal resin which comprises washing the film scrap with warm water to remove the emulsion therefrom and then leaching it with isopropyl alcohol.

5. A method for recovering a lower fatty acid ester of cellulose which is in intimate contact with a synthetic resin which comprises leaching the mass with isopropyl alcohol until the resin is substantially removed.

6. A method for recovering a lower fatty acid ester of cellulose which is in intimate contact with a synthetic resin which comprises subjecting it to a series of leachings with isopropyl alcohol of progressively increasing concentrations until the resin is substantially removed.

7. A method for recovering photographic film scrap having a base of a lower fatty acid ester of cellulose and a subbing layer of a synthetic resin which comprises washing the film scrap with warm water to remove the emulsion therefrom and then leaching it with isopropyl alcohol.

8. A method for recovering photographic film having a base of a lower fatty acid ester of cellulose in intimate contact with a synthetic resin which comprises washing the film scrap with warm water to remove the emulsion therefrom and then leaching it with isopropyl alcohol until the resin is substantially removed.

9. A method for recovering a lower fatty acid ester of cellulose which is in intimate contact with a polyvinyl acetal resin which comprises leaching the mass with isopropyl alcohol until the resin is substantially removed.

10. A method for recovering a lower fatty acid ester of cellulose which is in intimate contact with a polymerized alkyl acrylate which comprises leaching the mass with isopropyl alcohol until the resin is substantially removed.

ROBERT B. DAYTON.